US005083272A

United States Patent [19]

Walker et al.

[11] Patent Number: 5,083,272
[45] Date of Patent: Jan. 21, 1992

[54] INTERACTIVE TELEPHONE LOTTERY SYSTEM WITH A VERIFICATION CODE

[75] Inventors: Robert W. Walker, Glen Ellyn; Ricki S. Karp, Chicago; John S. Hayter, Glencoe, all of Ill.

[73] Assignee: Britcanus Corporation, Chicago, Ill.

[21] Appl. No.: 266,103

[22] Filed: Nov. 2, 1988

[51] Int. Cl.[5] .......... G06F 15/28; G06F 15/44
[52] U.S. Cl. .......... 364/412; 379/97
[58] Field of Search .......... 364/412, 410; 235/379-380; 379/97; 273/138 A, 139, 269, 85 R

[56] References Cited

U.S. PATENT DOCUMENTS

| | | | |
|---|---|---|---|
| 3,652,795 | 3/1972 | Wolf et al. | 179/2 DP |
| 3,976,840 | 8/1976 | Cleveland et al. | 364/900 |
| 4,412,287 | 10/1983 | Braddock, III | 364/408 |
| 4,451,701 | 5/1984 | Bendig | 179/2 TV |
| 4,494,197 | 1/1985 | Troy et al. | 364/412 |
| 4,539,435 | 9/1985 | Echmann | 179/2 A |
| 4,636,590 | 1/1987 | Cairns | 379/386 |
| 4,649,563 | 3/1987 | Riskin | 379/97 |
| 4,650,927 | 3/1987 | James | 379/97 |
| 4,677,659 | 6/1987 | Dargan | 379/97 |
| 4,689,742 | 8/1987 | Troy et al. | 364/412 |
| 4,694,397 | 9/1987 | Grant et al. | 235/379 |
| 4,716,583 | 12/1987 | Groner et al. | 379/88 |
| 4,734,564 | 3/1988 | Boston et al. | 364/408 |
| 4,815,741 | 3/1989 | Small | 273/1 E |
| 4,817,129 | 3/1989 | Riskin | 379/97 |
| 4,922,522 | 5/1990 | Scalon | 364/412 |
| 4,996,705 | 2/1991 | Entenmann et al. | 364/412 |

FOREIGN PATENT DOCUMENTS 8502700 6/1985 PCT Int'l Appl. .

OTHER PUBLICATIONS

"Service First With Far West Federal's Voice Response System", Bank Systems & Equipment, vol. 24 No. 11, pp. 84-85, Nov. 1987.

*Primary Examiner*—Gail O. Hayes
*Attorney, Agent, or Firm*—Willian Brinks Olds Hofer Gilson & Lione

[57] ABSTRACT

An interactive transaction system is provided. A user interacts with the system by means of a telephone which delivers output signals from the user and receives input signals from the system. The telephone is interfaced to a communication network through a switching unit. An account is provided from which the amount of the transaction is debited. A transaction microprocessor is interfaced to receive the input signals from the telephone which identify the transaction, the amount of the transaction and the user's personal identification code. The transaction microprocessor then communicates with the account microprocessor to authorize and complete the transaction.

10 Claims, 8 Drawing Sheets

INTERACTIVE TELEPHONE LOTTERY SYSTEM WITH A VERIFICATION CODE

BACKGROUND OF THE INVENTION

The present invention relates generally to an interactive telephone computer system and more specifically to interactive telephone computer system which may be used for various transactions which involve transfer of funds from an existing account.

Several systems are presently available with which a person may use a telephone to interact with a remotely located base computer system. Most of these existing systems involve the use of a telephone with a touch-tone keypad. The user provides input to the system log processing a predetermined sequence of keys on the keypad.

For example, U.S. Pat. No. 4,649,563 (Riskin) discloses a system which utilizes a conventional touchpad telephone to transmit and receive voice messages from a database computer. The touch-tone signals from the telephone are relayed to an access processor which in turn communicates with a computer base. The computer base then communicates with a billing computer. The database computer then provides a signal to a response storage unit which is interfaced with a voice synthesizer to relay a signal to the access processor. The access processor then provides a voice response which is transmitted through the telephone receiver to the caller.

U.S. Pat. No. 3,652,795 (Wolf et al.) discloses a system in which a telephone with a touchtone key pad may be used to complete transfer of funds transactions with a bank. The system uses a touchtone telephone receiving set which is equipped with a first decoding and printing means. The amount of a purchase is entered into system by means of the touch-tone receiving set. A computer at the bank receives code signals from the telephone set and, after decoding the signals, records the transaction at the bank. The system includes a telephone circuit in which frequencies generated by the touchtone action are transmitted over a telephone line to a telephone exchange which responds to switching instructions and selects the correct line to a computer control system at the bank. The receiver includes a decoding network which receives the signals from the bank, decodes the signals, and then provides a printing signal. The printing signal is provided to a printing mechanism which prints a line of digits to complete the transaction and certifies that funds have been transferred at the bank.

U.S. Pat. No. 4,539,435 (Eckmann) discloses an interactive educational system which is accessed using a touch-tone telephone keypad. The system is used by a student at a remote location to interact with an automated educational and testing center. The student is provided with a publication at his location where he is able to study the material. When the user wishes to be tested on the material, the user communicates via the telephone with a center which contains a central database. The center provides the user with a question and a number of possible answers in the form of a voice communication. Each answer is correlated to a specific button on the telephone keypad. The student chooses the answer by pressing the appropriate button on the telephone, thereby generating a machine-recognizable signal to the center. Automated equipment at the center recognizes the answer, chooses an appropriate reaction to the answer, and interacts by delivering the appropriate voice reaction to the student.

Although these references provide interactive systems in which a telephone keypad is used to interact with a computer at a remote location, they do not provide a system in which a user may select a predetermined transaction using a telephone at the user's location and to pay for the transaction using the same telephone system. Moreover, the available systems do not provide an arrangement in which a user may query the system as to the status of the user's account or of the status of the transaction. Nor do these systems provide an arrangement in which a user can easily modify the transaction request. Such a system may be desirable in several situations.

For example, such a system would be particularly useful to complete lottery or other gaming transactions using a telephone. Although remote lottery transaction systems have been previously disclosed, they do not provide an arrangement with which the user may complete the transaction with his telephone.

For example, U.S. Pat. Nos. 4,689,742 (Troy) and 4,494,197 (Troy) disclose automatic lottery systems in which a user communicates with a central processor from a play console which is remotely located from the lottery's central processor. The console is capable of providing data inputs to the central processor such as identification of the playing console, the player, amounts played, and the particular game selected. However, with the systems disclosed in these two references, the player must travel to the location where the console is located to complete the game transaction. Further, there is no means by which the player may choose to pay for the game by selecting a predetermined account from which the money is to be withdrawn from.

Other references which disclose systems providing interactive communication between a host computer and a user which employ a telephone keypad are U.S. Pat. Nos. 4,451,701 (Bendig) and 4,716,583 (Groner et al.).

Therefore, in view of the above, it is a primary object of the present invention to provide a method and system with which a user may select a transaction and pay for the transaction using a telephone at the user's location.

It is a further object of the present invention to provide an interactive telephone transaction system wherein a user can modify a previously selected transaction.

It is a further object of the present invention to provide an interactive telephone computer system wherein the user may query the status of a selected transaction or the status of the user's account.

It is still a further object of the present invention to provide an interactive telephone computer system wherein the system will verify whether the user has sufficient funds in the account for the transaction and inform the user when a transaction causes his account to be overdrawn.

It is still a further object of the present invention to provide a system wherein the system has voice recognition capabilities to interact with the user.

SUMMARY OF THE INVENTION

To achieve the foregoing and other objects and in accordance with the purposes of the present invention, the interactive telephone transaction system may include a telephone which is used by a customer to interact with the system to select and complete a desired transaction. The telephone is operative to generate a telephone output signal and to receive an incoming signal. A switching means interfaces the input and output signals from and to the telephone with a telephone communication network. The system also includes a money account means which is used by the customer to pay for the transaction. The account means includes an account processor which is preprogrammed to process transactions involving the user's account. A transaction processor is connected to the switching means and to the account processor over the communication network. The transaction processor includes a program which receives a signal which has been entered by the user using the telephone and which identifies the transaction and the amount of the transaction. The transaction processor program further includes logic which communicates with the money access account to authorize the transaction. The transaction processor program debits the amount of the transaction from the user's account and completes the transaction if authorization has been received from the money access account means. The program further includes logic which generates a signal indicating the status of the transaction. The status of the transaction may include information such as an indication that the transaction cannot be completed because it was not authorized by the money access account means. Means are provided for communicating the status signal from the processor to the user.

In a preferred embodiment of the invention, the interactive telephone system is used to complete lottery type transactions over the telephone. In this embodiment, the processor is programmed to receive a signal and allow the user to select a particular lottery game. The user may enter the amount of money the user wished to play in the game and the program will verify whether the user is authorized to withdraw this amount from the account. The program also allows the user to modify the lottery transaction.

Additional objects, advantages and novel features of the invention will be set forth in part in the description which follows, and in part will become apparent to those skilled in the art upon examination of the following or may be learned by practice of the invention. The objects and advantages of the invention may be obtained by means of the combinations particularly pointed in the appended claims.

DETAILED DESCRIPTION OF THE PRESENTLY PREFERRED EMBODIMENTS

Figure 1:
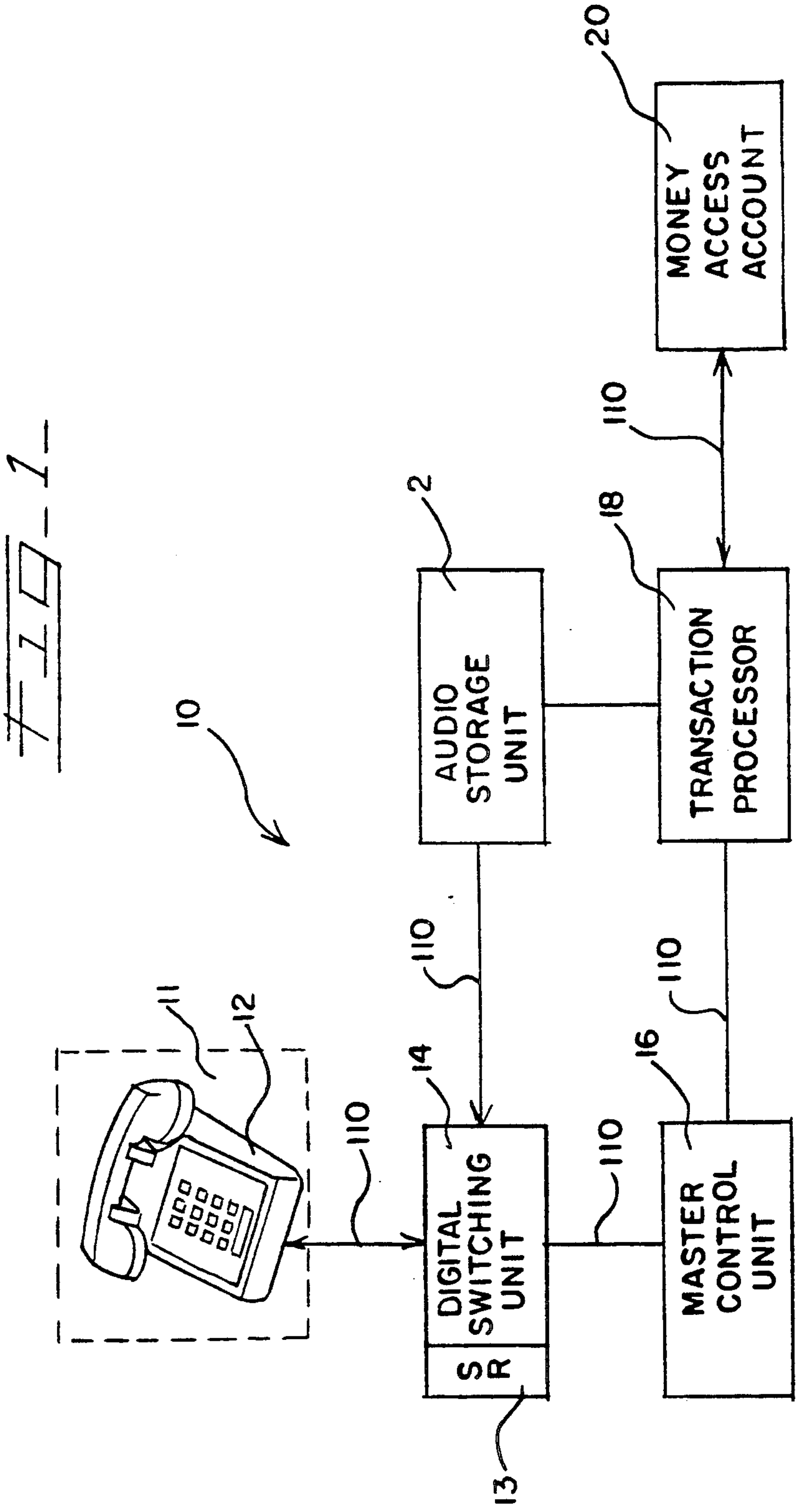
FIG. 1 is a schematic diagram, in block diagram form, illustrating a preferred embodiment of the interactive telephone system of the present invention.

Referring now specifically to FIG. 1, the telephone based interactive transaction system of the present invention is designated generally by reference numeral 10. For purposes of illustration portions of the description which follows are directed to a lottery game system. It will be recognized by those skilled in the art, however, that the invention is not limited to lottery games and contemplates other transactions such as catalog transactions or game shows.

The system 10 includes a telephone 12, preferably of the touchtone keypad type, which is located at a customer's location 11. A customer's or user's location 11 is defined here as the customer's home, office or any other location in which the user may have access to a telephone. That is, a location that is not the location of the representative of the seller, store or service center to which a customer would normally have to travel for the transaction.

The telephone 12 is connected, preferably over a conventional telephone connection network 110, to a digital switching unit (DSU) 14. The digital switching unit is preferably a general purpose stored program controlled, digital switching machine such as one that includes 1024 time slots. The digital switching unit 14 serves as the main interface to the public telephone switched network. A suitable digital switching unit is available from Summa Four, Inc., Manchestor, N.H. as an SDS-1000 specialty digital switching system. The digital switching unit is preferably equipped with a dual tone multi-frequency (DTMF) receiver in order for the digital switching unit 14 to operatively receive the DTMF signals generated by the keypad of the telephone 12.

One or more digital switching units 14 may be combined with a host computer, referred to here as the master control unit (MCU) 16. The master control unit 16 provides the call processing functions and controls the cluster of digital switching units 14. As will be recognized by those skilled in the art, the number of digital switching units 14 that the master control unit 16 will support is determined by customer demand and processor real time, throughput and other limitations.

As stated above, the master control unit 16 directs the call processing functions associated with the transaction. For example, the master control unit provides several operating functions to the system. Depending on the configuration, the master control unit 16 is used to detect either incoming line or trunk seizure. The master control unit preferably attaches to multi-frequency receiver to receive the called number. When the master control unit 16 receives an incoming call it translates the called number and directs the call, based on a stored routing table. Preferably the master control unit 16 attaches to the multi-frequency receiver in the digital switching unit 14. Where a line connection is utilized, the master control unit 16 also automatically connects the caller to a speech channel. The master control unit 16 also disconnects the caller from the speech channel and signals a disconnect at the end of a call. The master control unit 16 further functions to monitor the call process and release the speech channel if the caller is disconnected prematurely.

The master control unit 16 also preferably provides audible ringing back to the caller and removes the audible ringing and signals answer supervision to the distant end when directed by the transaction processor. The call supervision indicates to the originating office that the call has been completed and trips the telephone billing function.

The master control unit 16 is preferably a mini-computer. The size of the mini-computer is determined by the number of digital switching unit's 14 being supported by the system, the call volume and the complexity of the switching and transaction operation. A suitable mini-computer is available from Data General Corp., Westboro, Mass.

The master control unit 16 (or the digital switching unit 14) is interconnected to a transaction processor 18. If the digital control unit 14 is provided with a processor capable of performing the call processing functions, the digital control unit 14 may be interfaced directly to the transaction processor 18. The transaction processor is preprogrammed such that it includes logic to support the lottery (or other transaction) purchase functions as described in more detail below.

The system 10 is preferably interfaced to a public telephone switched network in one of two ways, with the digital switching unit 14 serving as the interfacing vehicle in either of the two methods used. In the most preferred embodiment the interface is implemented by means of a trunk side connection. Such trunk side connections are typically used by exchange carriers and other high volume services. The trunk side connection may be optionally arranged to pass the called number to the digital switching unit 14, depending on local requirements. As discussed above, the digital switching unit 14 is arranged to detect a seizure and to attach a receiver circuit.

In another exemplary embodiment, a line side connection is employed to interface the system 10 to the public telephone switched network. A line side connection typically consists of a normal tip and ring telephone drop and an assigned telephone number. Typically these lines are arranged into a "hunt group" to facilitate access. A suitable interface is available as Model No. RJ11 from several commercial sources.

Preferably the digital switching unit 14 includes a line circuit card which is configured to detect ringing current and to connect through to an announcement after the second ring based on line assignment within the digital switching unit 14. Preferably the digital switching unit 14 is also configured to accept direct inward dialing (DID) calls where such a feature is available.

The digital switching unit 14 recognizes a line seizure and the ringing signal and answers the call, typically within one or two ringing cycles. After the digital switching unit 14 has answered a call, an associated serving office preferably signals answer supervision back toward the originating office.

The system 10 preferably includes a money access account means 20 from which the user pays for the purchase of lottery tickets or other transaction activities. The transaction processor 18 includes logic which interfaces with the money access account means processor 21. Suitable money access accounts are described in more detail below.

Preferably, the system 10 is also provided with an audio storage unit (ASU) 2. The ASU 2 is interfaced to the transaction processor 18. In this preferred embodiment, the transaction processor 18 provides the audio storage unit 2 with a message which is to be transmitted to the user at the location 11 over the telephone 12. The audio storage unit converts the signal from the transaction processor 18 to an analog signal which is converted to a voice signal by the telephone 12. In this manner, the caller receives voice instructions and information from the transaction processor 18.

The audio storage unit 2 is provided with audio information stored in digital form (T1 carrier format at the DS 0 level). To create the audio storage information, the 0-to-4 KHz nominal voice band is first converted to digital pulse code modulation and then stacked or multiplexed into higher bit streams to form 24 channel groupings (24–64 KBS voice paths or DS 1).

An operator preferably groups the audio information stored in the audio switching unit 2 into instruction sets of phrases. The phrases may be recalled by the transaction processor 18 by phase number. Phases can be concatenated through a series of phase numbers to form word strings or complete sentences command from the transaction processor 18.

In another aspect of the invention, the digital switching unit 14 may include a speaker independent speech recognizer 13 which would translate an analog signal corresponding to a voice input from the telephone 12 into a signal which could be recognized by the digital witching unit 14. In this manner the user could communicate with the system by direct voice input.

In a preferred embodiment the system 10 includes another transaction processor 18 (not shown) to serve as a back up for the first transaction processor 18. Each processor 18 includes means (not shown) for storing data relating to the transactions. Such storage means may be a fixed disk, a floppy disk or any other suitable storage system.

Figure 2:
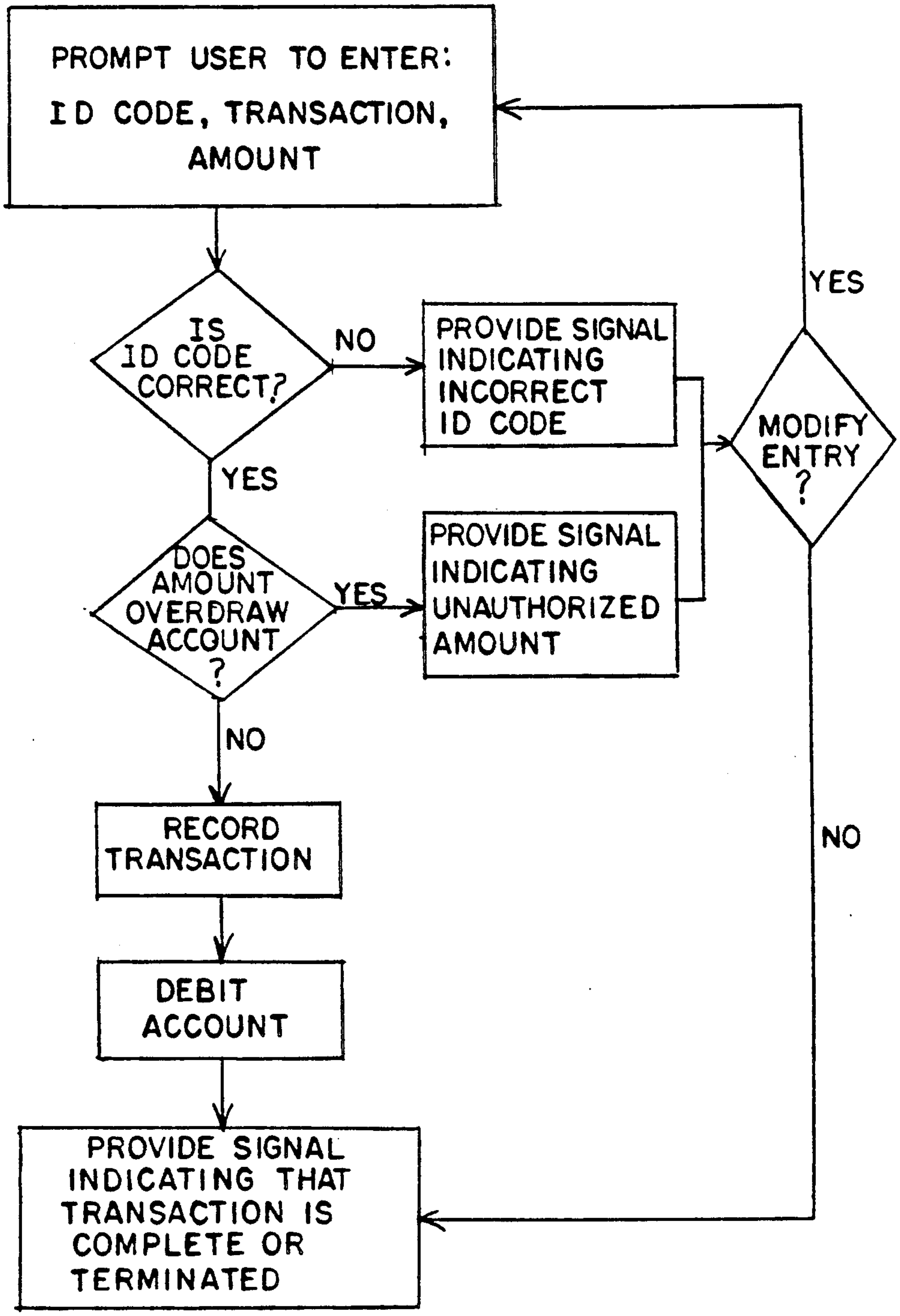
FIG. 2 is a flow chart illustrating a preferred embodiment of the logic for the transaction processor.
Figure 3A:
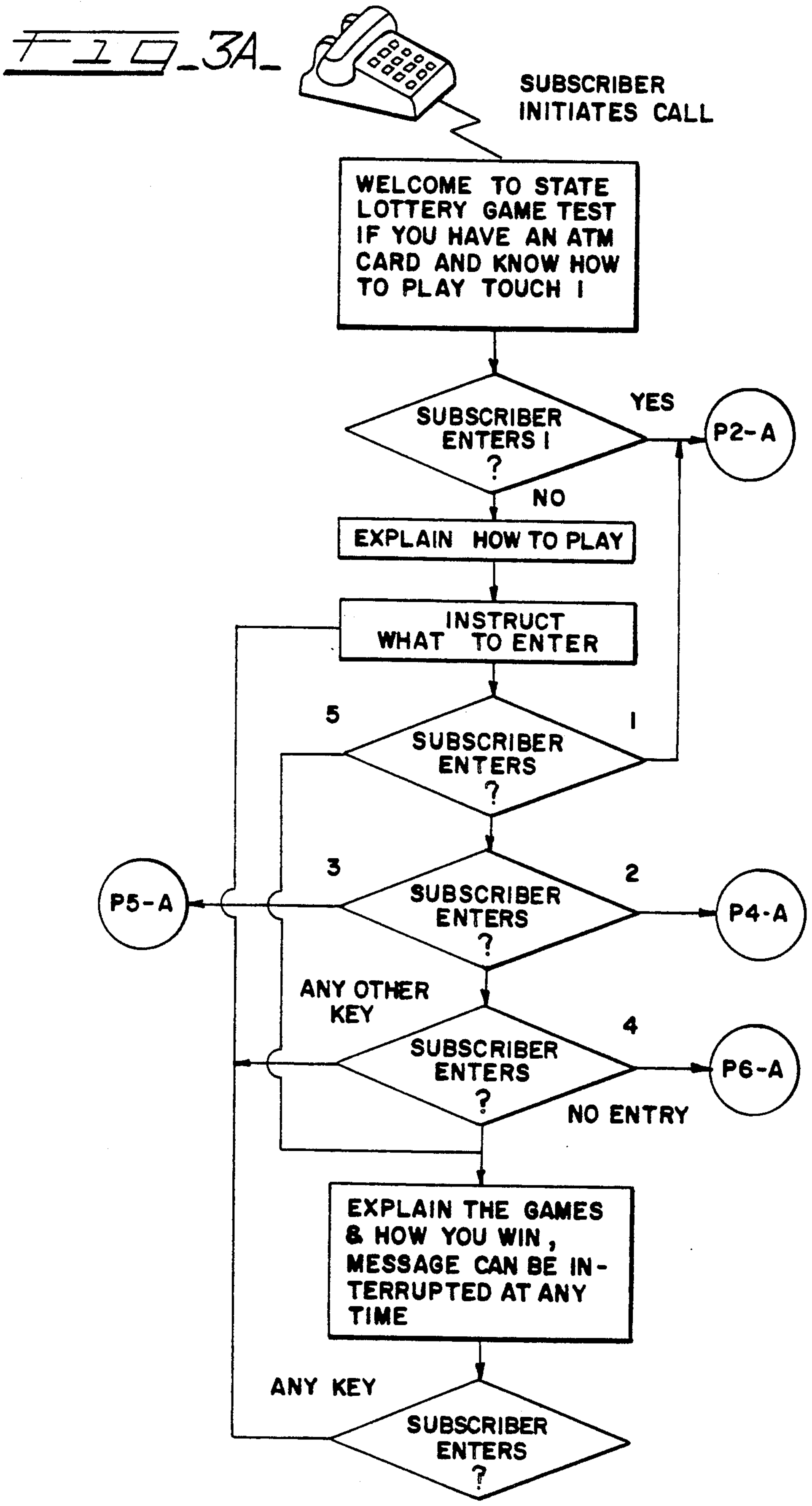
FIGS. 3*a*–3*f* illustrate a preferred embodiment of the logic for a lottery processor.
Figure 3B:
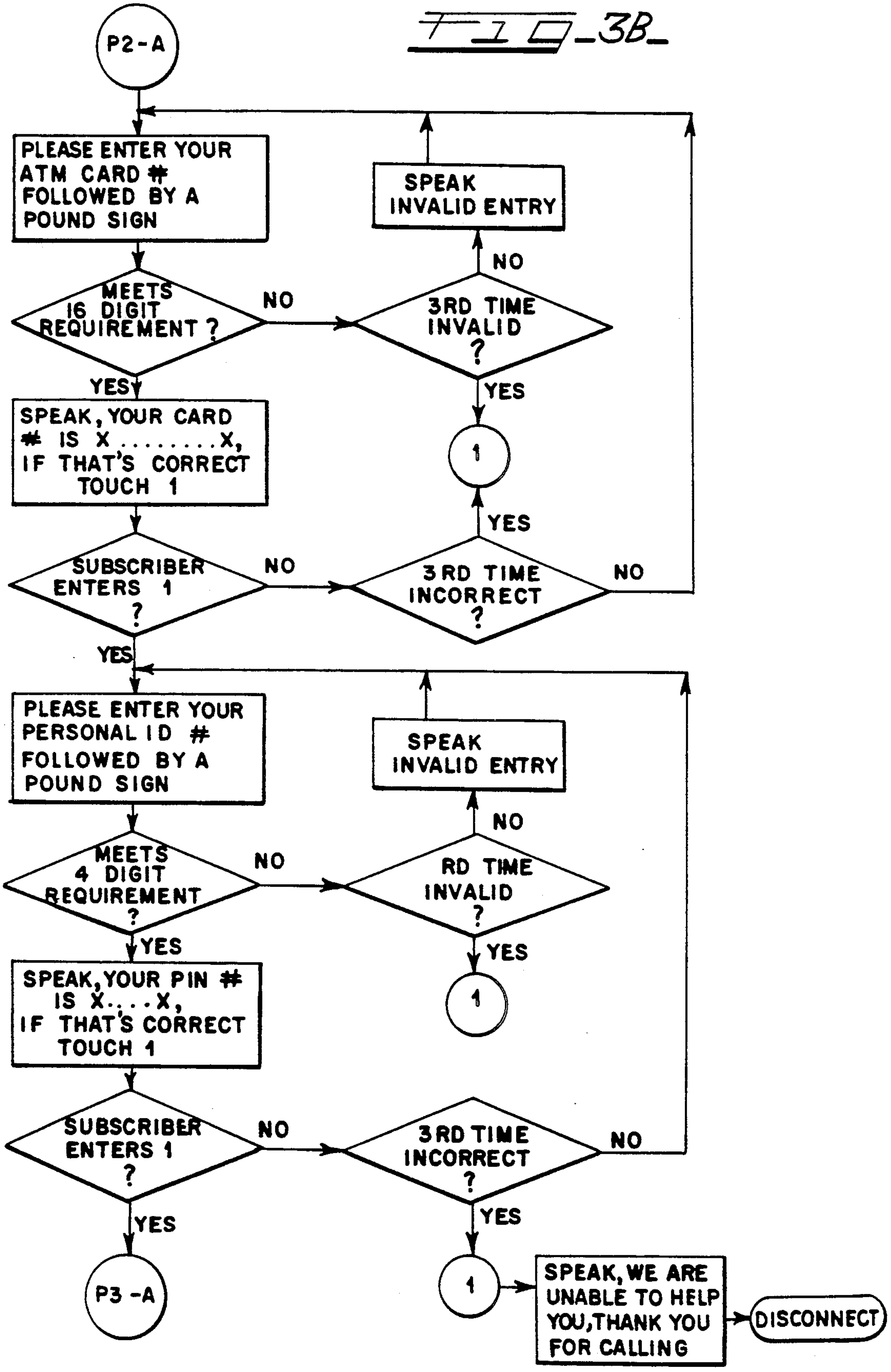
Figure 3C:
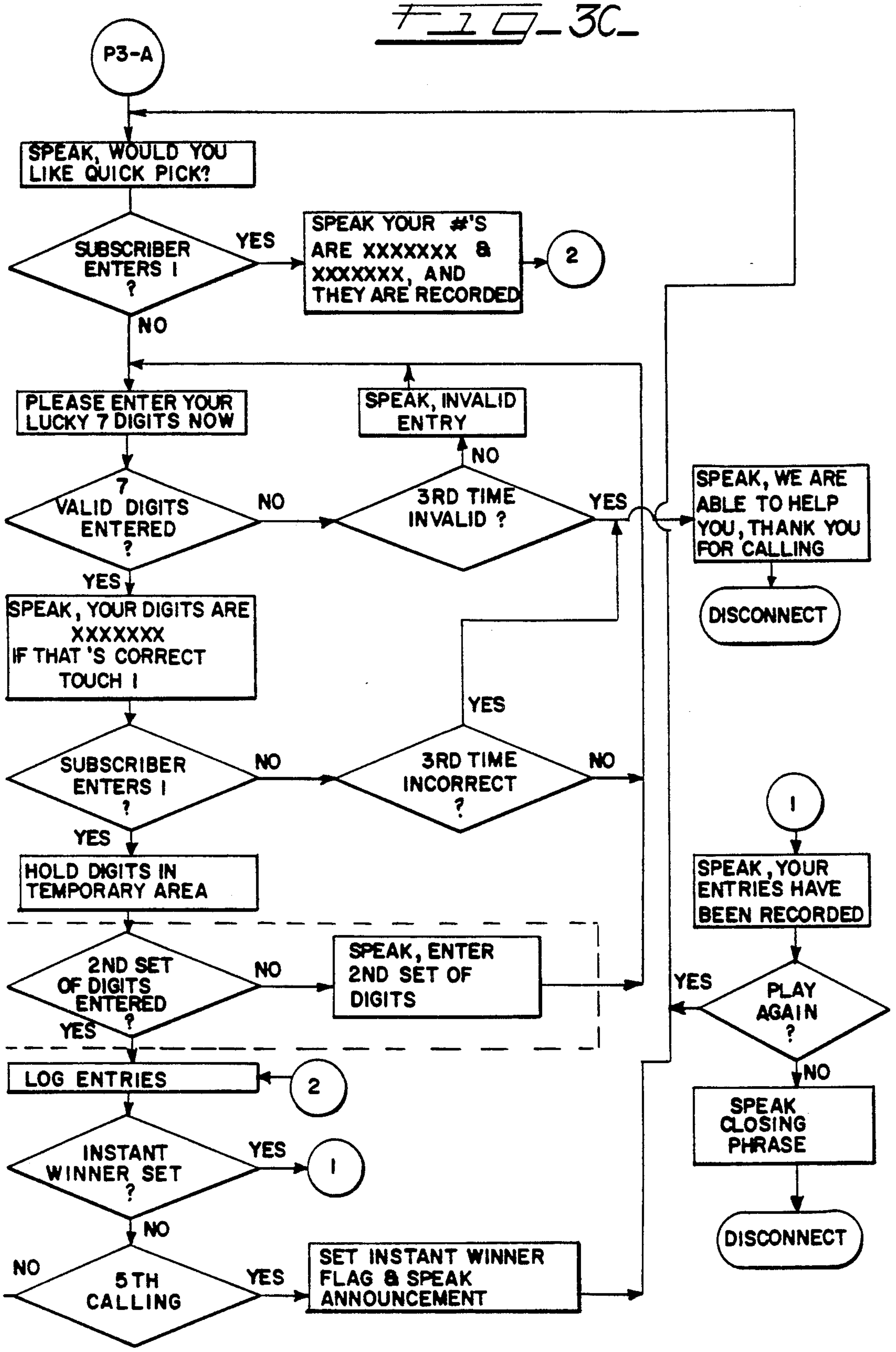
Figure 3D:
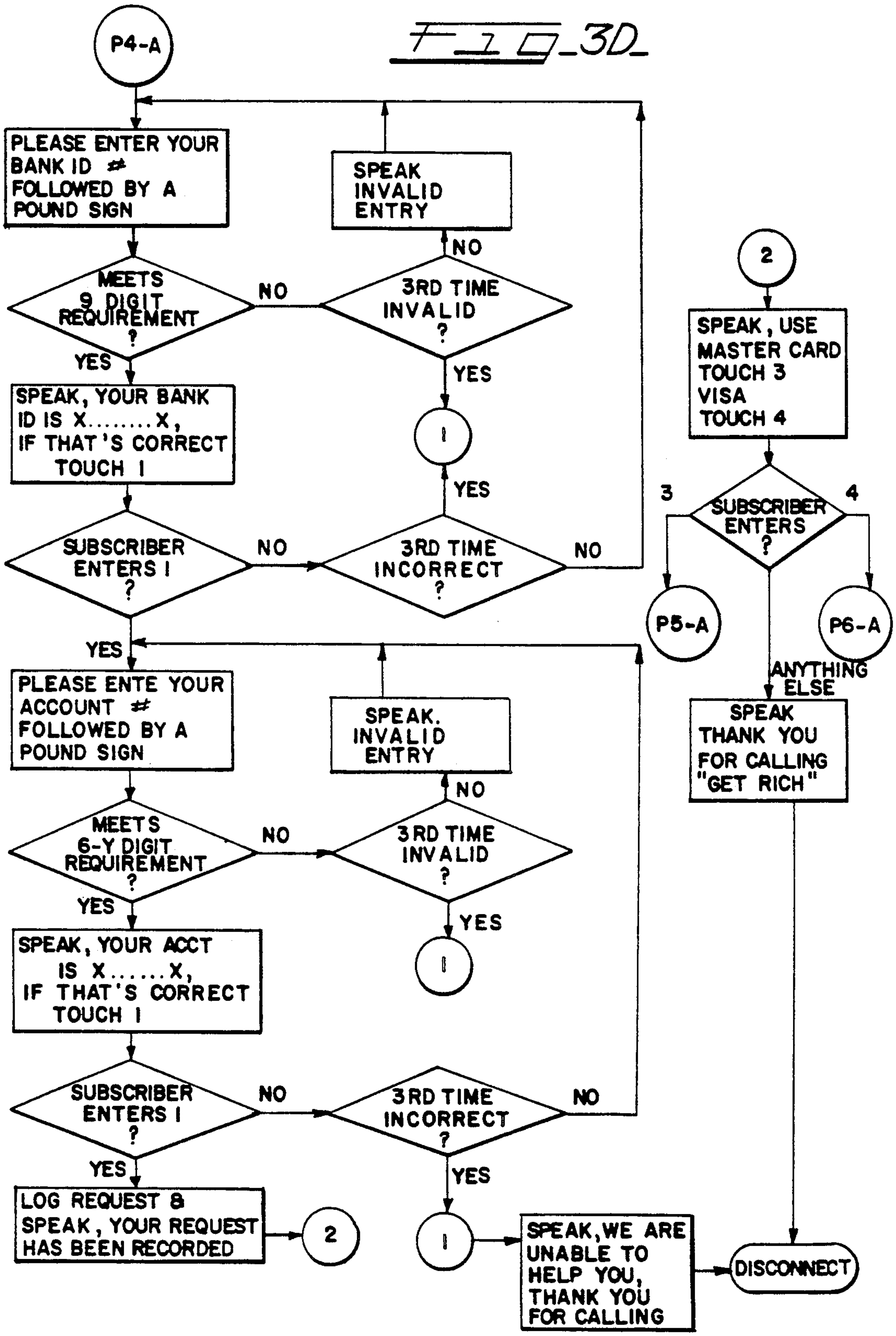
Figure 3E:
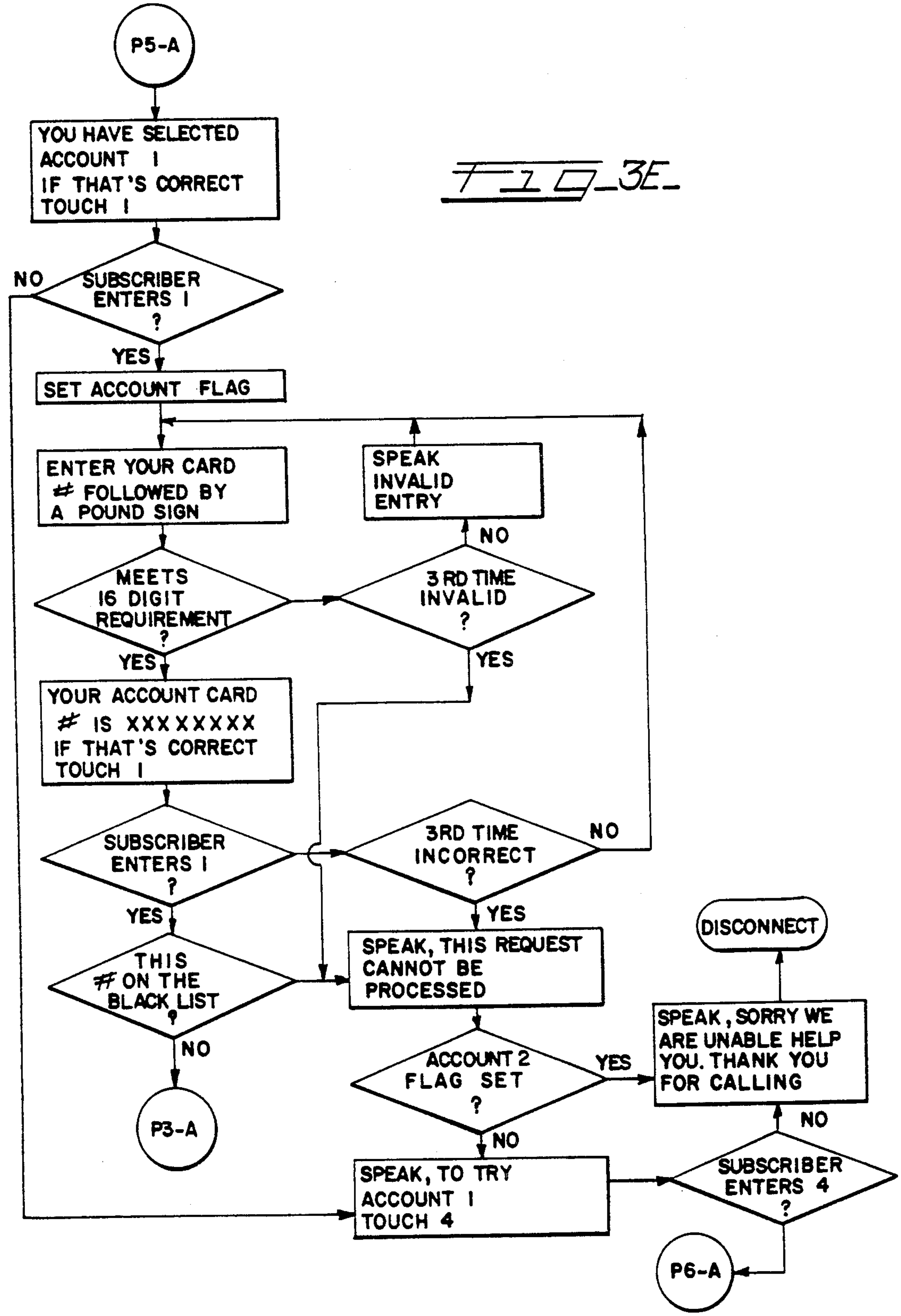
Figure 3F:
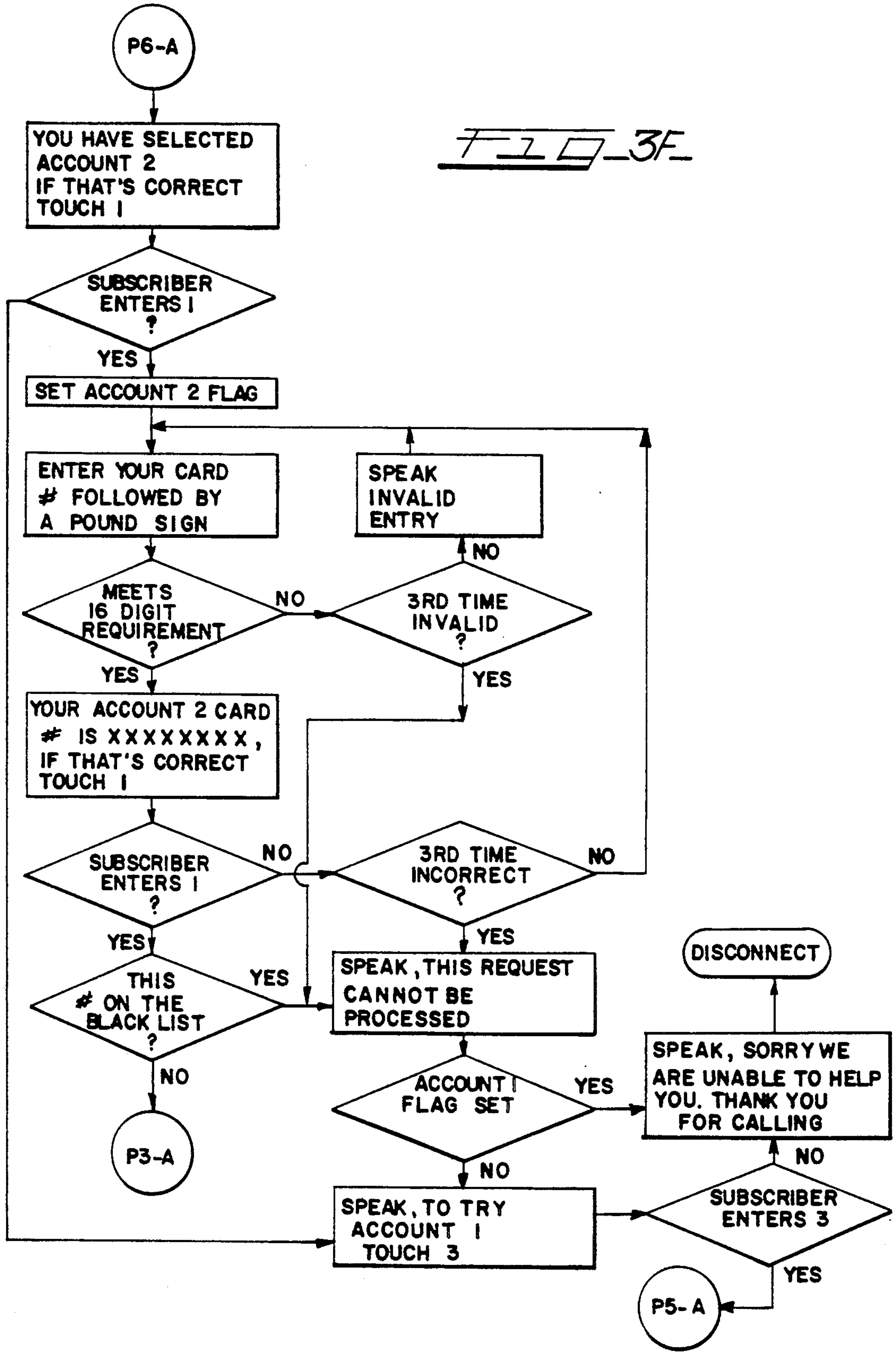

A FIG. 2 illustrates a preferred embodiment of the logic for the transaction processor 18. The logic first provides a welcoming message and information regarding the game, such as the most current grand winning number. The logic then provides a signal to prompt the user to enter his identification code. The processor receives the account code which is entered by the caller at the telephone 12 at his location 11 and checks the entry for validity. If the caller's number is recognized by the transaction processor 18 as an authorized user, the transaction processor 18 then prompts the user to select the lottery game which the user intends to play and the corresponding lottery number for the game. The customer enters the selection and amount by using the keypad of the telephone 12. The processor logic then develops a check code to confirm the selected number.

The processor 18 also preferably includes logic which allows the user at the location 11 to inquire as to the status of his account. Preferably the transaction processor 18 is programmed such that if the user attempts to exceed the user's authorized charging limit, the transaction processor 18 provides a signal which advises the user that the transaction cannot be completed. As described in more detail below, the transaction processor 18 is preferably preprogrammed to communicate with the money access account 20 and debit the account upon the user's request for the transaction which he has selected.

In the preferred embodiment the transaction processor 18 includes logic which provides instruction which may be used by new players. The player would first enter a code, using the keypad of the telephone 12, to indicate that he wishes "help" instructions. The processor program would then provide instructions on how to properly use the system 10. Preferably the logic of the transaction processor 18 also is programmed to identify when a caller or user has entered an incorrect entry and to advise the caller on how to use the "help" feature of the system 10 at any time during the call.

The transaction processor 10 may also include other suitable logic to provide customer services. These services may provide the caller with winning numbers for a predetermined number of previous drawings.

Finally, the processor logic may be programmed to provide a closing message to the user.

Although the system 10 may be designed to work with any normal accessing number system, it is preferred that the accessing be provided by a statewide 800 access code. In this manner, the telephone company will not be charging for a lottery (or other gaming service).

The money access account 20 may be a credit card account. In this embodiment the transaction processor 18 is interfaced with the computer or processor at the credit card company. With such accounts, the charges may be viewed as a cash advance or may be directly charged as a charge to the account. Since these accounts typically provide a personal identification number (PIN) this number may be entered by the user through the telephone 18 to authorize the transaction. In this manner, preauthorization of the account is established.

In another embodiment of the invention, the transaction processor 18 is interfaced to a computer at a bank, to thereby access the user's bank account. In this manner, the user can authorize the withdrawal of the amount of the transaction from his account by entering the amount over the telephone 12. Optionally, the transaction processor 18 may be interfaced to an automatic teller machine (ATM) to thereby access the user's account through the ATM. Since these ATM's typically provide the user with PIN codes, these codes may be used as described above for the user to access the account. Optionally, a separate PIN will be assigned to the user for transactions involving the interactive telephone system 10. In this embodiment, the transactions which the user has completed over the interactive telephone system 10 could appear on the user's monthly banking statement.

FIGS. 3*a*-3*f* illustrate a preferred embodiment of the logic for the processor 18 for a lottery game system.

In another embodiment of the invention, the caller subscribes to the lottery game through a presubscription lottery account. The user deposits money in the account in advance to playing the game. In this manner, the user may use his telephone 12 to dial the appropriate code to interface with his presubscription lottery account. In this embodiment the transaction processor 18 is preprogrammed to check the user's presubscription account balance before authorizing a transaction by the user. Preferably a PIN number would be provided to the user, thereby preventing unauthorized access to the presubscription lottery account.

As will be recognized by those skilled in the art, other money access accounts may be suitable for use with the present invention. For example, an independent bill paying agency which handles certain cash transfers common to normal monthly billings may be authorized by the caller to pay for the lottery transactions. In this embodiment, the transaction processor 18 would be interfaced with a processor at the agent's location. The necessary funds would be transferred from the agent to pay for the lottery activities. The security systems discussed above with regard to the other money access accounts may also be used to prevent unauthorized use.

A concern associated with a lottery game over a telephone facility is the lack of "hard copy" proof that the number selected was, indeed, the number registered for the drawing. Therefore the system preferably includes a self-checking validation code. Any validation code used with such a system must be able to confirm the original lottery number. In one preferred embodiment for confirming the number selected requires the caller to re-enter the originating number a second time. Should the number differ on the second entry, then the entire transaction is rejected and the caller must start over with the lottery number selection.

Mindful that humans are known to make the same mistake more than once, then a second entry is unlikely to persuade anyone that theirs was not the winning number. What is needed is any entirely new number that serves to confirm the original selection.

Therefore, in a second more preferred embodiment entry validation is implemented by means of the base number subtraction method. For example, the lottery number consists of four digits, then a base number of 10,000 can be employed. Should a caller select 4227 as the lottery number, the validation code would be (10,000−4227)=5773. The caller would be asked to enter this number, 5773, thereby confirmed the original lottery number of 4227. This method will provide some security, provided the caller does not forget which number was selected and which was the validation code. Because there may be some similarity in the two numbers, some confusion may occur.

A third more preferred embodiment avoids this by substituting letters for the thousands (most significant) digit and units (least significant) digit. The touch tone keypad is typically divided into both numbers and letters as shown below:

| Touch Tone Keypad Digit | Touch Tone Keypad Letters | Substitution Code |
|---|---|---|
| 1 | | # |
| 2 | ABC | A |
| 3 | DEF | D |
| 4 | GHI | G |
| 5 | JKL | J |
| 6 | MNO | M |
| 7 | PRS | P |
| 8 | TUV | T |
| 9 | WXY | W |
| 0 | OPER | * |
| # | | |

Using letter substitution for 5773 could provide J77D as a validation code for lottery selection 4227. Because the one and zero digits on the keypad are not assigned a letter combination, the asterisk (*) is used for zero digit replacement and the number sign (#) for the digit one replacement.

Although the base number subtraction method provides advantages over other methods, it is not without limitations. Should a caller select lottery number 0001, then the validation code will be W99W. (10,000−0001=9999 validation code) While this is acceptable, selecting 0000 would result in a validation code of *00*. This is the same code as the lottery number and therefore, not a very good check. Similarly, lottery number 5000 results in a validate code of 5000, i.e., J00* also the same as the number selected.

Therefore in yet another embodiment, a method avoids ending up with the same validated code as the number selected by changing the number to an arbitrary base number when the caller selects certain lottery numbers. The selection of lottery number 0000 or 5000 would cause the base number to automatically change to 7599, reducing the possibility of error or misunderstanding.

Base number subtraction is a simple method validating the number the caller selected. It requires no complex computation and is easy to understand. While no system is fool proof, the base number subtraction method provides four caller checks on the selected lottery number.

1. Caller enters the selected lottery number.
2. Computer repeats the lottery number and require the caller to confirm the selection.
3. Computer announces the validation code and requests the caller enter this code to confirm the transaction.
4. The computer again repeats the selected lottery number and concludes the transaction.

The last check, item four above, is a repeat of the selected lottery number developed from the validation code.

It will be recognized by those skilled in the art that other simpler or more complex validation schemes are possible depending on the intended use and desired security.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical applications to thereby enable others skilled in the art to best utilize the invention and various embodiments and with various modifications as are suited to the particular use contemplated. It is intended that the scope of the invention be defined by the following claims, including all equivalents.

I claim:

1. An interactive telephone lottery system for playing a lottery game comprising:

a telephone disposed at a user's location, said telephone including a touchtone keypad operative to generate dual tone multi-frequency output signals and said telephone operative to transmit voice signals and receive an input signal;

switching means operatively connected to said telephone for interfacing said input and output signals from said telephone to a telephone communication network;

money access account means having an account processor for processing transactions involving a user's account, said account having a pre-established source of funds;

a lottery game processor operatively connected to said switching means and to said account processor through said communication network, said access processor including a program including logic means for a) receiving a dual tone multi-frequency signal from said telephone, said signal identifying a lottery transaction and the amount of said lottery transaction, b) communicating with said money access account processor to authorize said transaction, c) upon receiving authorization from said money access account processor, debiting the amount of said transaction from said account, d) completing said lottery transaction, and 3) generating a status signal indicating the status of said lottery transaction;

means for communicating said status signal to said telephone; and interactive validation means for verifying data associated with the lottery transaction entered by the user, said interactive validation means including means for checking said data entered by the user, means for generating a validation code corresponding to said data means for prompting said user to enter said validation code on said keyboard, and means for comparing the validation code entered by the user with said lottery transaction entered by the user; means for preventing completion of said lottery transaction.

2. The interactive telephone lottery system of claim 1 wherein said telephone output signals comprise voice input signals and wherein said switching means includes a speech recognizer.

3. The interactive telephone lottery system of claim 1 wherein said program further includes logic means for communicating with said money access account means to determine whether said amount of said transaction exceeds a predetermined limit for said account means and to generate a signal indicating that said transaction is unauthorized if said limit is exceeded.

4. The interactive telephone lottery system of claim 3 wherein said program further includes logic means for allowing a user to query the status of said money access account means, obtain information about said transaction, and to modify said transaction.

5. The interactive telephone lottery system of claim 1 wherein means for communicating said status signal to said telephone comprises audio storage means for providing a voice signal to said telephone.

6. The interactive telephone lottery system of claim 1 further comprising master control means operatively connected in said communication network for directing call processing functions associated with said transaction.

7. The interactive telephone lottery system of claim 1 wherein said money access account means comprises means for accessing a credit card account.

8. The interactive telephone lottery system of claim 1 wherein said money access account means comprises means for accessing a bank account.

9. The interactive telephone lottery system of claim 8 wherein said bank account comprises a bank account accessed through an automatic teller machine.

10. The interactive telephone lottery system of claim 1 wherein said account processor includes a predetermined identification code for authorizing a transaction from said user's account.

* * * * *